(12) United States Patent
Wu (10) Patent No.: US 11,057,953 B2
(45) Date of Patent: Jul. 6, 2021

(54) DEVICE AND METHOD OF HANDLING COMMUNICATIONS IN A DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/913,928

(22) Filed: Mar. 7, 2018

(65) Prior Publication Data
US 2018/0263072 A1 Sep. 13, 2018

Related U.S. Application Data

(60) Provisional application No. 62/468,927, filed on Mar. 8, 2017.

(51) Int. Cl.
*H04W 76/15* (2018.01)
*H04L 29/08* (2006.01)
(Continued)

(52) U.S. Cl.
CPC ......... *H04W 76/15* (2018.02); *H04L 63/1416* (2013.01); *H04L 63/1425* (2013.01);
(Continued)

(58) Field of Classification Search
CPC ..... H04W 76/15; H04W 76/12; H04W 76/20; H04W 76/16; H04W 76/19; H04W 76/18;
(Continued)

(56) References Cited

U.S. PATENT DOCUMENTS 9,763,282 B2 * 9/2017 Pelletier ............... H04W 36/00
9,883,419 B2 * 1/2018 Basu Mallick ..... H04W 28/085
(Continued)

FOREIGN PATENT DOCUMENTS

| CN | 104584633 A | 4/2015 |
| CN | 104980964 A | 10/2015 |
| CN | 106211352 A | 12/2016 |

OTHER PUBLICATIONS

Nokia, Alcatel-Lucent Shanghai Bell, "General considerations for LTE-NR tight interworking", 3GPP TSG-RAN WG2 Meeting #95, R2-164752, Aug. 22-26, 2016, Gothenburg, Sweden, XP051126491, pp. 1-11.
(Continued)

*Primary Examiner* — Habte Mered
(74) *Attorney, Agent, or Firm* — Winston Hsu (57) ABSTRACT

A communication device for handling communications in a dual connectivity comprises a storage device for storing instructions and a processing circuit coupled to the storage device. The storage device stores, and the processing circuit is configured to execute instructions of establishing a first signaling radio bearer (SRB) with a master base station (MBS); establishing a second SRB with a secondary BS (SBS); receiving a first radio resource control (RRC) message comprising a first configuration, on the first SRB from the MBS; receiving a second RRC message comprising a second configuration, on the second SRB from the SBS; and applying the first configuration and ignoring the second configuration, when detecting a conflict between the first configuration and the second configuration.

17 Claims, 7 Drawing Sheets

(51) Int. Cl.
| | |
|---|---|
| *H04W 76/16* | (2018.01) |
| *H04L 29/06* | (2006.01) |
| *H04W 76/12* | (2018.01) |
| *H04W 36/00* | (2009.01) |
| *H04W 76/20* | (2018.01) |
| *H04W 76/19* | (2018.01) |
| *H04W 36/14* | (2009.01) |
| *H04L 12/26* | (2006.01) |
| *H04W 76/18* | (2018.01) |

(52) U.S. Cl.
CPC .......... *H04L 63/1441* (2013.01); *H04L 67/12* (2013.01); *H04L 69/22* (2013.01); *H04W 36/0027* (2013.01); *H04W 36/0069* (2018.08); *H04W 76/12* (2018.02); *H04W 76/16* (2018.02); *H04W 76/20* (2018.02); *H04L 43/0811* (2013.01); *H04W 36/14* (2013.01); *H04W 76/18* (2018.02); *H04W 76/19* (2018.02)

(58) Field of Classification Search
CPC ......... H04W 36/0069; H04W 36/0027; H04W 36/14; H04W 63/1416; H04W 63/1425; H04W 63/1441; H04W 67/12; H04W 69/22; H04L 43/0811
See application file for complete search history.

(56) References Cited

U.S. PATENT DOCUMENTS

| | | | | |
|---|---|---|---|---|
| 10,499,448 B2* | 12/2019 | Mallick | ............. | H04W 72/0413 |
| 10,638,333 B2* | 4/2020 | Liu | ....................... | H04W 16/32 |
| 2014/0056243 A1* | 2/2014 | Pelletier | ............ | H04W 72/1268 370/329 |
| 2014/0187165 A1 | 7/2014 | Wu | | |
| 2016/0192304 A1 | 6/2016 | Yi | | |
| 2017/0311212 A1* | 10/2017 | Yamada | ............ | H04W 36/0072 |

OTHER PUBLICATIONS

Nokia, Alcatel-Lucent Shanghai Bell, "On UE capability and network node coordination aspects in LTE-NR tight interworking", 3GPP TSG-RAN WG2 Meeting #95bis, R2-166243, Oct. 10-14, 2016, Kaohsiung, Taiwan, XP051150840, pp. 1-9.
Nokia, Alcatel-Lucent Shanghai Bell, "RRC aspects for the direct signalling path from secondary node to the UE", 3GPP TSG-RAN WG2 NR Adhoc, R2-1700055, Jan. 17-19, 2017, Spokane, USA, XP051210642, pp. 1-6.
Intel Corporation, "Discussion on NR SgNB configuration transfer", 3GPP TSG-RAN WG2 NR Ad Hoc, R2-1700322, Jan. 17-19, 2017, Spokane, USA, XP051203966, pp. 1-2.
NEC, "Direct RRC signalling on SCG in LTE-NR Dual Connectivity", 3GPP TSG-RAN WG2 #97, R2-1701947, Feb. 13-17, 2017, Athens, Greece, XP051212473, pp. 1-3.
3GPP TS 36.331 V14.1.0 (Dec. 2016), "3rd Generation Partnership Project; Technical Specification Group Radio Access Network; Evolved Universal Terrestrial Radio Access (E-UTRA);Radio Resource Control (RRC); Protocol specification (Release 14)", XP051230537, pp. 1-653.
Search Report dated Jul. 19, 2018 for EP application No. 18160656.7, pp. 1-8.
3GPP TS 36.331 V14.1.0, Dec. 2016.
Office action dated Dec. 17, 2019 for the China application No. 201810189862.1, filed Mar. 8, 2018, p. 1-13.

* cited by examiner

DEVICE AND METHOD OF HANDLING COMMUNICATIONS IN A DUAL CONNECTIVITY

CROSS REFERENCE TO RELATED APPLICATIONS

This application claims the benefit of U.S. Provisional Application No. 62/468,927, filed on Mar. 8, 2017, which is incorporated herein by reference.

BACKGROUND OF THE INVENTION

1. Field of the Invention

The present invention relates to a device and a method used in a wireless communication system, and more particularly, to a device and a method of handling communications in a dual connectivity.

2. Description of the Prior Art

In a long-term evolution (LTE) system, a radio resource control (RRC) connection reconfiguration procedure is used to configure radio bearers (RBs), handover, measurements, carrier aggregation or dual connectivity.

SUMMARY OF THE INVENTION

The present invention therefore provides a communication device and method for handling communications in a dual connectivity to solve the abovementioned problem.

A communication device for handling communications in a dual connectivity comprises a storage device for storing instructions and a processing circuit coupled to the storage device. The storage device stores, and the processing circuit is configured to execute instructions of establishing a first signaling radio bearer (SRB) with a master base station (MBS); establishing a second SRB with a secondary BS (SBS); receiving a first radio resource control (RRC) message comprising a first configuration, on the first SRB from the MBS; receiving a second RRC message comprising a second configuration, on the second SRB from the SBS; and applying the first configuration and ignoring the second configuration, when detecting a conflict between the first configuration and the second configuration.

A communication device for handling communications in a dual connectivity comprises a storage device for storing instructions and a processing circuit coupled to the storage device. The storage device stores, and the processing circuit is configured to execute instructions of establishing a first SRB with a MBS; establishing a second SRB with a SBS; receiving a handover command message on the first SRB from the MBS; receiving a RRC message on the second SRB from the SBS; and performing a handover according to the handover command message and ignoring the RRC message.

A communication device for handling communications in a dual connectivity comprises a storage device for storing instructions and a processing circuit coupled to the storage device. The storage device stores, and the processing circuit is configured to execute instructions of establishing a first SRB with a MBS; establishing a second SRB with a SBS; transmitting a first RRC response message on the first SRB in response to a first RRC message, when receiving the first RRC message on the first SRB; and transmitting a second RRC response message on the second SRB in response to a second RRC message, when receiving the second RRC message on the second SRB.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
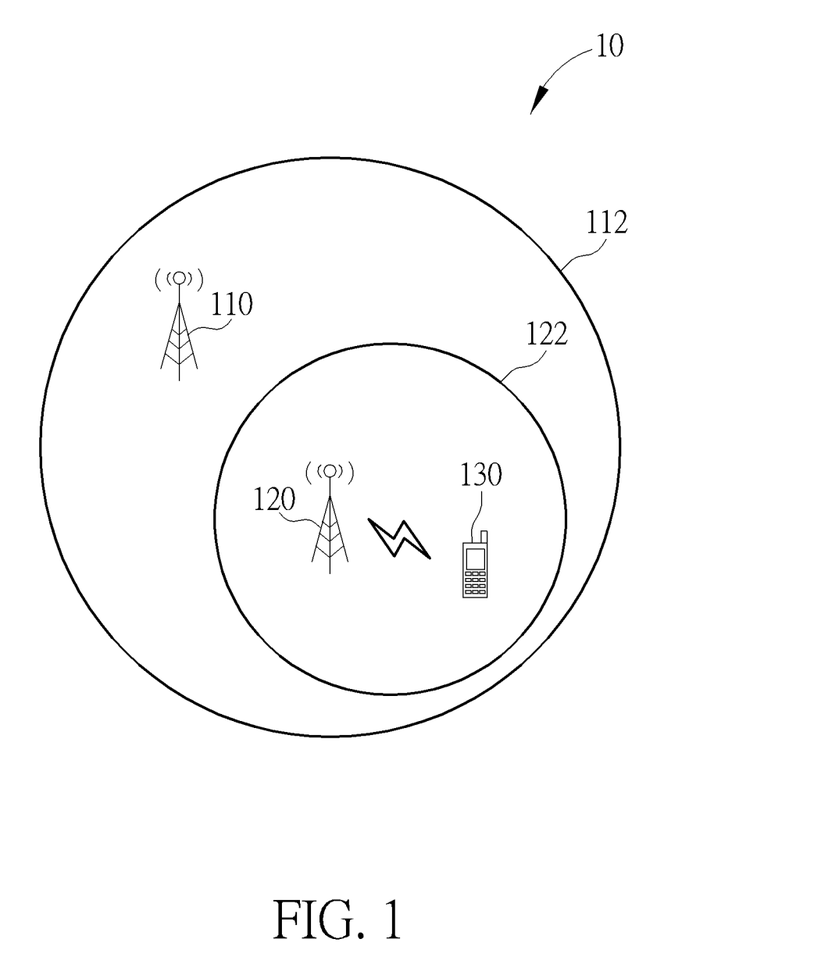
FIG. 1 is a schematic diagram of a wireless communication system for a dual connectivity scenario according to an example of the present invention.

FIG. 1 is a schematic diagram of a wireless communication system 10 for a dual connectivity (DC) scenario according to an example of the present invention. The wireless communication system. 10 operates a long-term evolution (LTE) communication system and a fifth generation (5G) communication system, and includes a master base station (MBS) 110, a secondary BS (SBS) 120, and a communication device 130, but is not limited herein. The MBS 110 may be a macro cell BS, and may provide a first coverage area 112. The SBS 120 may be a small cell BS, and may provide a second coverage area 122 which is smaller than the first coverage area 112. The second coverage area 122 may overlap completely with the first coverage area 112, or may be partially outside the first coverage area 112. The communication device 130 in DC is dually connected to the MBS 110 and the SBS 120. That is, the communication device 130 may be capable of performing downlink (DL) receptions from both the first cell of the MBS 110 and the second cell of the SBS 120. It should be noted that the MBS 110 and the SBS 120 may operate on the same or different carriers.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a DL, the network is the transmitter and the communication device is the receiver.

Figure 2:
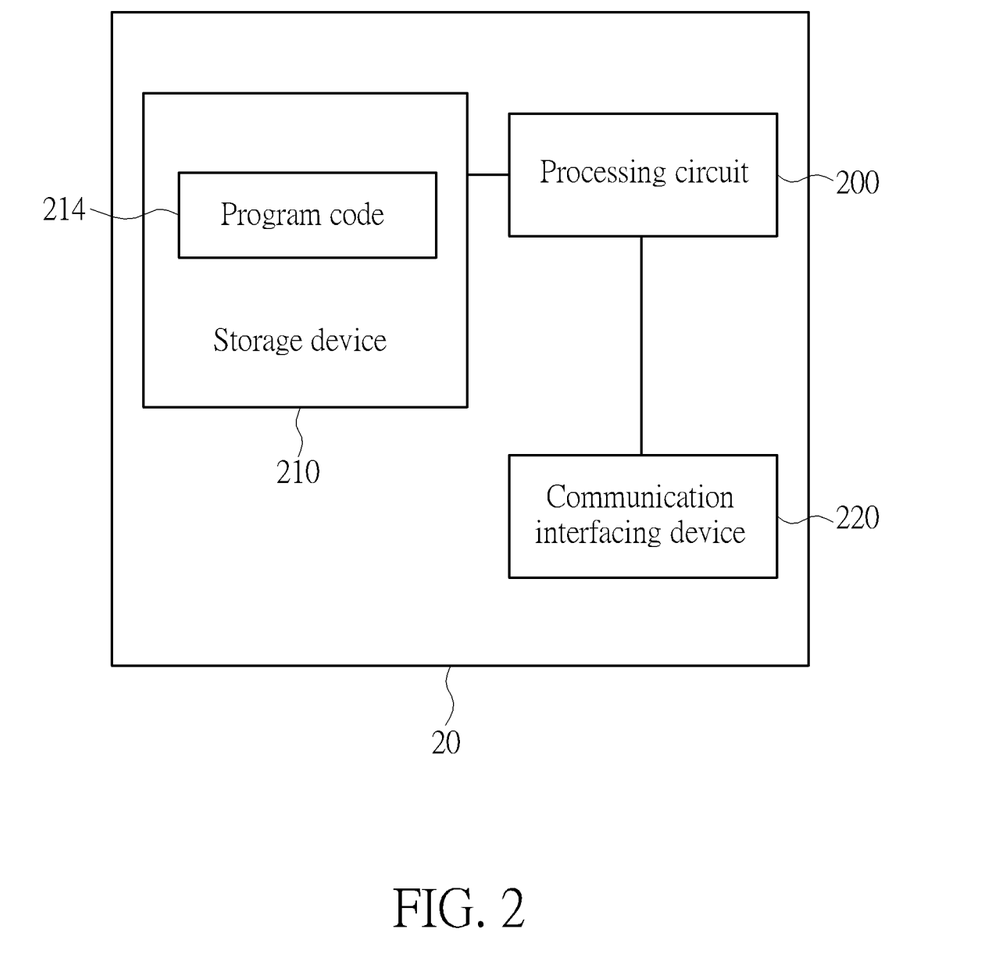
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as microprocessor(s) or Application Specific Integrated Circuit(s), at least one storage device 210 and at least one communication interfacing device 220. The at least one storage device 210 may be any data storage device that may store program codes 214, accessed and executed by the at least one processing circuit 200. Examples of each of the at least one storage device 210 include but are not limited to a subscriber identity module, read-only memory, flash memory, random-access memory, hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

A radio bearer (RB) may be a data radio bearer (DRB) for user plane data transmission and/or reception or a signaling radio bearer (SRB) for control plane data transmission and/or reception. A DRB configuration may include a DRB identity, a Packet Data Convergence Protocol (PDCP) configuration (e.g., a header compression configuration or a reordering timer), a logical channel identity and/or a logical channel configuration (e.g., a priority and a logical channel group). A SRB configuration may include a SRB identity, a Radio Link Control (RLC) configuration and/or a logic channel configuration.

In DC, there may be at least three types of DC radio bearers: a master cell group (MCG) bearer, a secondary cell group (SCG) bearer and a split bearer. The MCG bearer utilizes radio protocols only located in a MBS (e.g., the MBS 110) to use MBS resources. The SCG bearer utilizes radio protocols only located in a SBS (e.g., the SBS 120) to use SBS resources. The split bearer utilizes radio protocols located in both the MBS (e.g., the MBS 110) and the SBS (e.g., the SBS 120) to use both the MBS resources and the SBS resources. The split bearer can be established via MCG bearer (i.e., MCG split bearer) or via SCG bearer (i.e., SCG split bearer). In general, the DRB or the SRB may be the MCG bearer, the SCG bearer or the split bearer. The MBS or the SBS may be an evolved Node-B (eNB), an enhanced LTE (eLTE) eNB or a gNB. In DC in the LTE system and the 5G system, the MBS is the eNB or the eLTE eNB, and the SBS is the gNB. In one example, the MBS is the gNB, and the SBS is the eNB or the eLTE eNB. In LTE DC, the MBS and the SBS are eNBs or eLTE eNBs. In 5G DC, the MBS and the SBS are gNBs.

In the following examples, a UE is used to represent a communication device 130 in FIG. 1, to simplify the illustration of the embodiments. A MBS may be the MBS 110 in FIG. 1, and a SBS may be the SBS 120 in FIG. 1.

Figure 3:
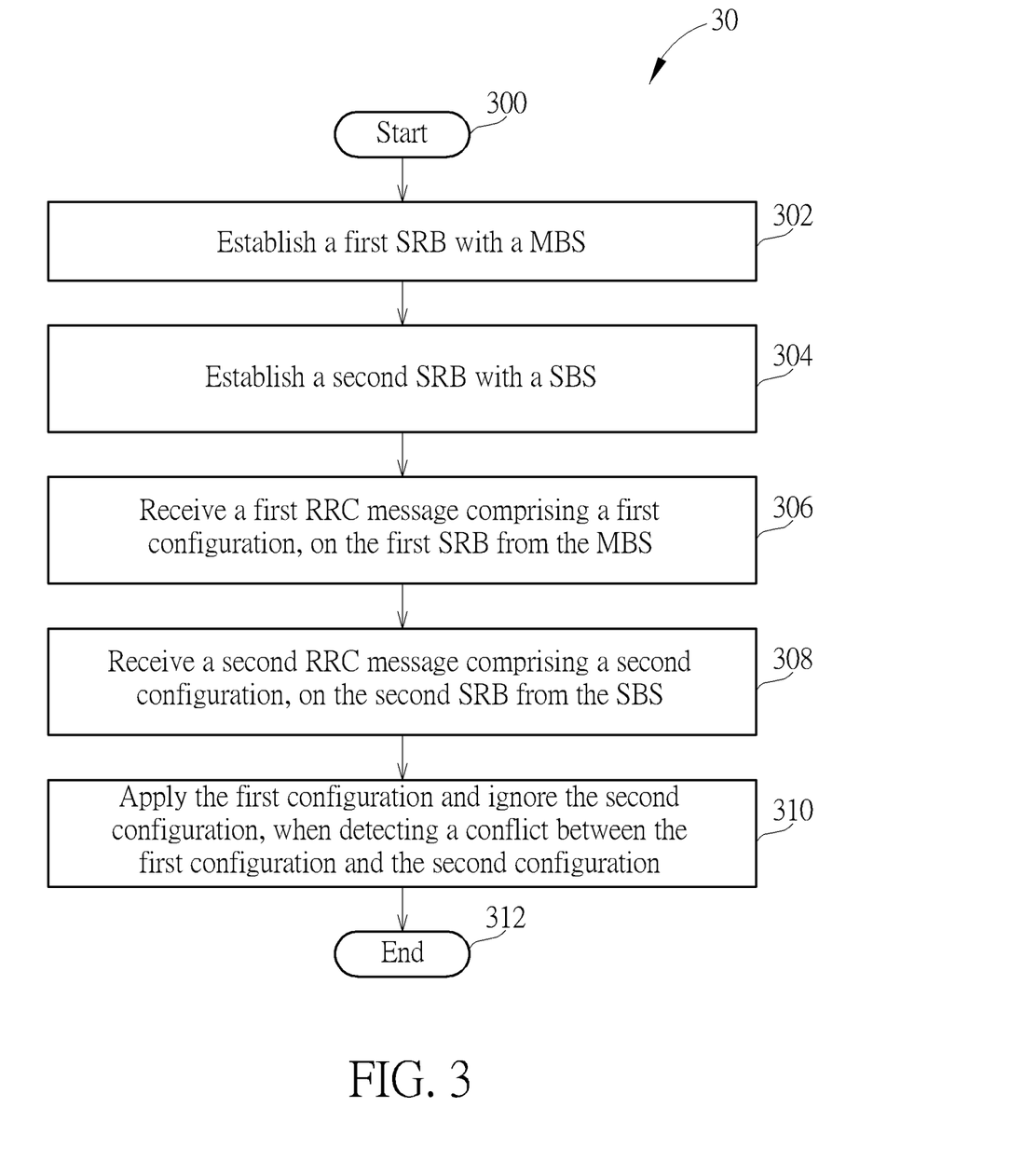
FIG. 3 is a flowchart of a process according to an example of the present invention.

A process 30 as shown in FIG. 3 is utilized in a UE, to handle communications in a DC, and includes the following steps:

Step 300: Start.
Step 302: Establish a first SRB with a MBS.
Step 304: Establish a second SRB with a SBS.
Step 306: Receive a first radio resource control (RRC) message comprising a first configuration, on the first SRB from the MBS.
Step 308: Receive a second RRC message comprising a second configuration, on the second SRB from the SBS.
Step 310: Apply the first configuration and ignore the second configuration, when detecting a conflict between the first configuration and the second configuration.
Step 312: End.

The following examples may be applied to the process 30.

In one example, the UE transmits a third RRC message to the MBS or the SBS, wherein the third RRC message indicates a first reconfiguration failure on the second configuration or the conflict between the first configuration and the second configuration. In one example, when the MBS receives the third RRC message, the MBS transmits a message to the SBS, wherein the message indicates the first reconfiguration failure or the conflict between the first configuration and the second configuration. In one example, when the SBS receives the third RRC message, the SBS may know that the first reconfiguration failure or the conflict between the first configuration and the second configuration occurs. The UE does not apply the second configuration. In one example, the UE transmits the third RRC message on the first SRB to the MBS or on the second SRB to the SBS.

In one example, the UE receives a third configuration in a first RRC reconfiguration message (e.g., RRC Connection Reconfiguration message) on the first SRB from the MBS. The third configuration configures or reconfigures a parameter used by the UE to communicate with the MBS. The UE determines a second reconfiguration failure, if the third configuration is invalid. Then, the UE performs a first RRC connection reestablishment procedure in response to the second reconfiguration failure.

In one example, the UE establishes the first SRB to the MBS on at least one first carrier. The UE receives a second RRC reconfiguration message on the first SRB from the MBS, wherein the second RRC reconfiguration message configures the UE to connect to the SBS on at least one second carrier. The UE determines a third reconfiguration failure according to a fourth configuration for communication with the SBS in the second RRC reconfiguration message. The MBS and the SBS are in the same radio access technology (RAT) such as LTE or 5G or different RATs. That is, the fourth configuration is invalid. The UE performs a second RRC connection reestablishment procedure in response to the third reconfiguration failure.

In one example, the UE applies the first configuration and the second configuration, when detecting no conflict between the first configuration and the second configuration.

Figure 4:
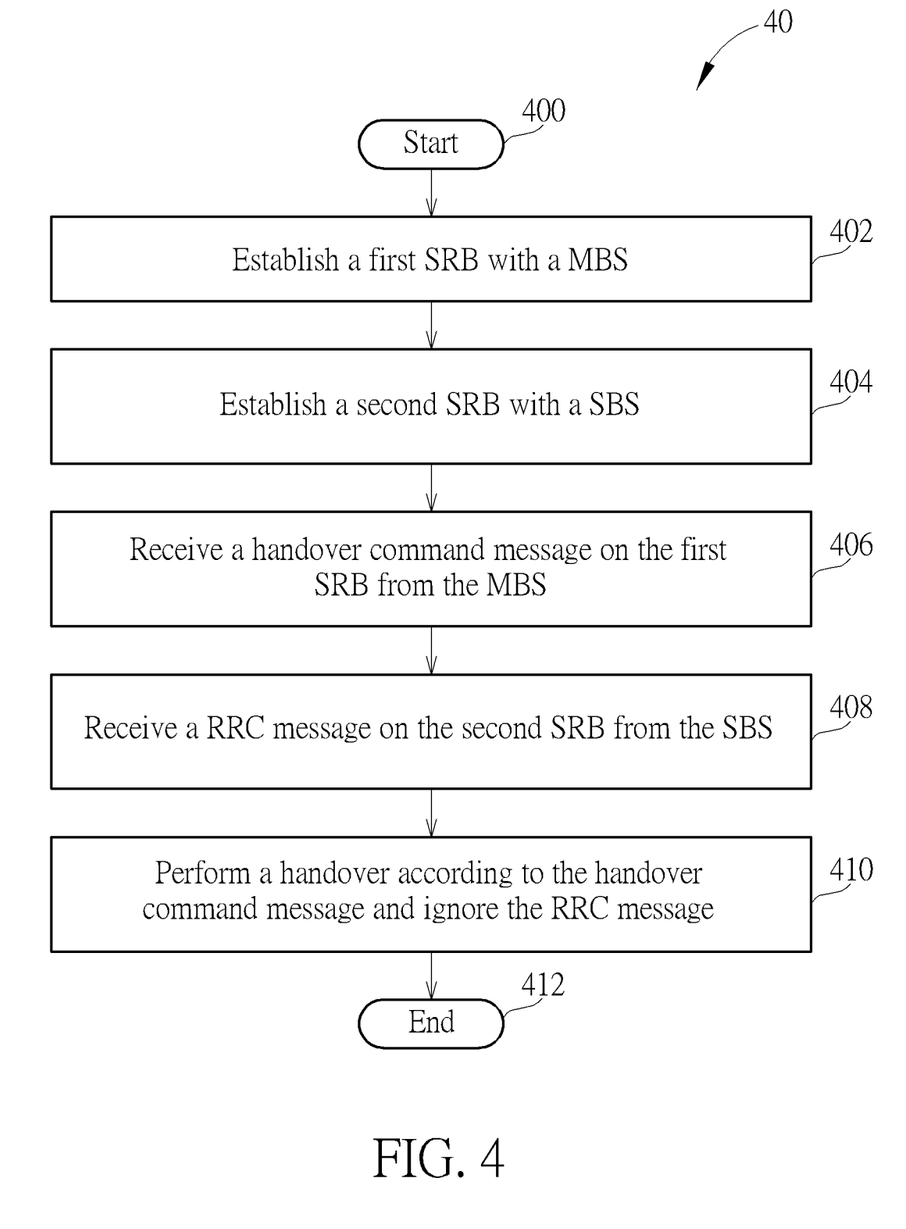
FIG. 4 is a flowchart of a process according to an example of the present invention.

A process 40 as shown in FIG. 4 is utilized in a UE, to handle communications in a DC, and includes the following steps:

Step 400: Start.
Step 402: Establish a first SRB with a MBS.
Step 404: Establish a second SRB with a SBS.
Step 406: Receive a handover command message on the first SRB from the MBS.
Step 408: Receive a RRC message on the second SRB from the SBS.
Step 410: Perform a handover according to the handover command message and ignore the RRC message.
Step 412: End.

The following examples may be applied to the process 40.

In one example, the UE receives the handover command message, when receiving or processing the RRC message. In one example, the UE receives the RRC message, when receiving or processing the handover command message. The RRC message does not trigger a handover for the UE.

In one example, the UE ignores the RRC message by discarding the RRC message. In one example, the UE ignores the RRC message by not applying at least one configuration in the RRC message.

In one example, the handover command message includes (or simply is) a first LTE RRC Connection Reconfiguration message or a first NR RRC Reconfiguration message. In one example, the RRC message includes (or simply is) a second LTE RRC Connection Reconfiguration message or a second NR RRC Reconfiguration message.

Figure 5:
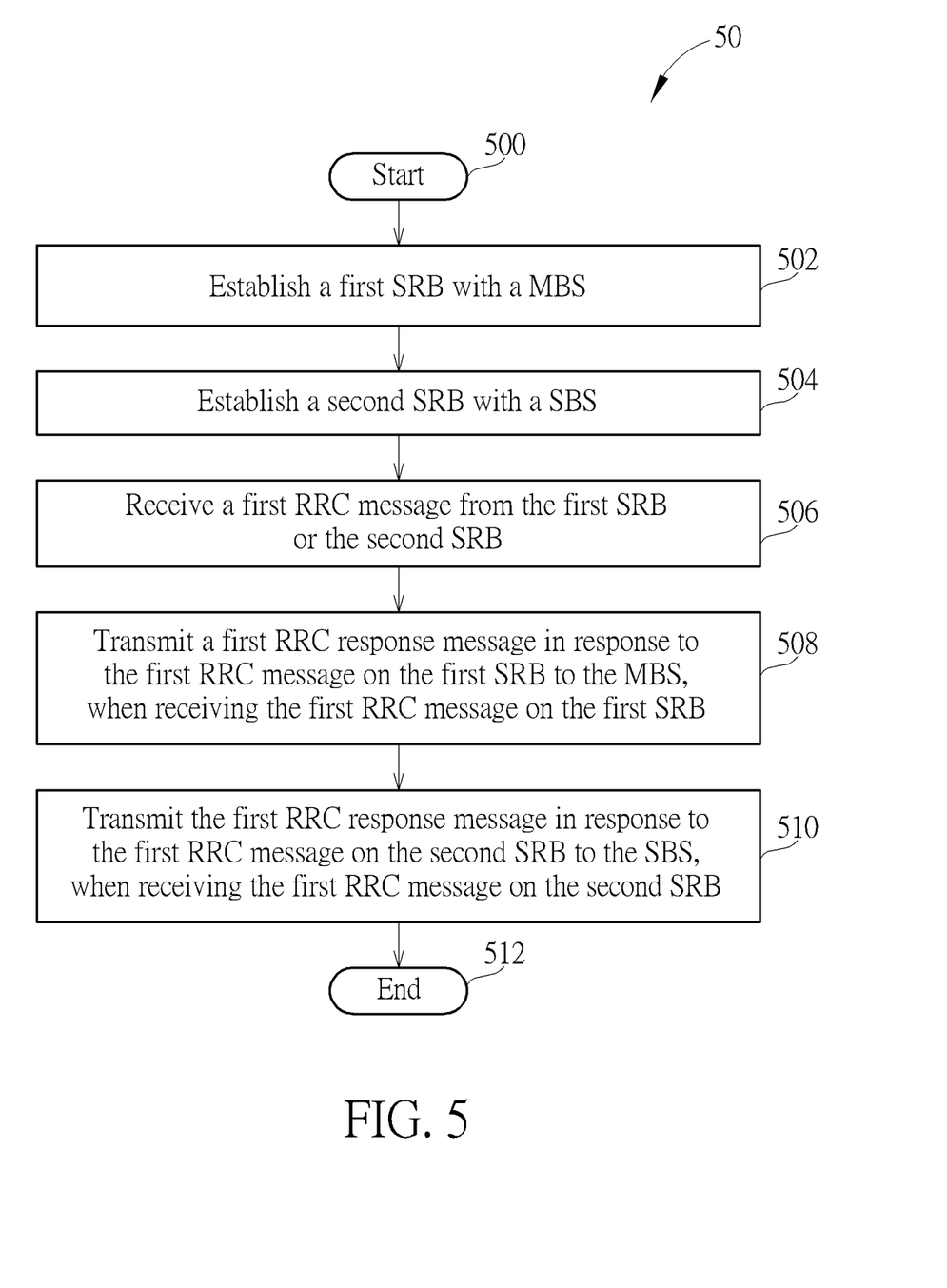
FIG. 5 is a flowchart of a process according to an example of the present invention.

A process 50 as shown in FIG. 5 is utilized in a UE, to handle communications in a DC, and includes the following steps:

Step 500: Start.
Step 502: Establish a first SRB with a MBS.
Step 504: Establish a second SRB with a SBS.
Step 506: Receive a first RRC message on the first SRB or the second SRB.
Step 508: Transmit a first RRC response message in response to the first RRC message on the first SRB to the MBS, when receiving the first RRC message on the first SRB.
Step 510: Transmit the first RRC response message in response to the first RRC message on the second SRB to the SBS, when receiving the first RRC message on the second SRB.
Step 512: End.

The following examples may be applied to the process 50.

In one example, when the MBS receives the first RRC message from the SBS, the MBS transmits the first RRC message on the first SRB to the UE or transmits a second RRC message including the first RRC message on the first SRB to the UE. The UE transmits the first RRC response message on the first SRB to the MBS in response to the first RRC message or transmits a second RRC response message including the first RRC response message on the first SRB to the MBS in response to the second RRC message including the first RRC message. When the MBS receives the first RRC response message or the second RRC response message on the first SRB, the MBS knows that the first RRC message or the second RRC message has been received by the UE. Then, the MBS transmits a message to the SBS or forwards the first RRC response to the SBS. Thus, the SBS knows that the first RRC message has been received by the UE.

In one example, when the SBS receives the first RRC response message on the second SRB from the UE, the SBS knows that the first RRC message transmitted on the second SRB has been received by the UE. In one example, when the SBS receives the first RRC response message on the second SRB from the UE, the SBS transmits a message to the MBS to inform that a reconfiguration of a SBS configuration (e.g., any of a measurement configuration, a SCG DRB configuration, a Media Access Control (MAC) configuration, a RLC configuration, etc.), a SCG change or a SBS change has been done successfully.

Figure 6:
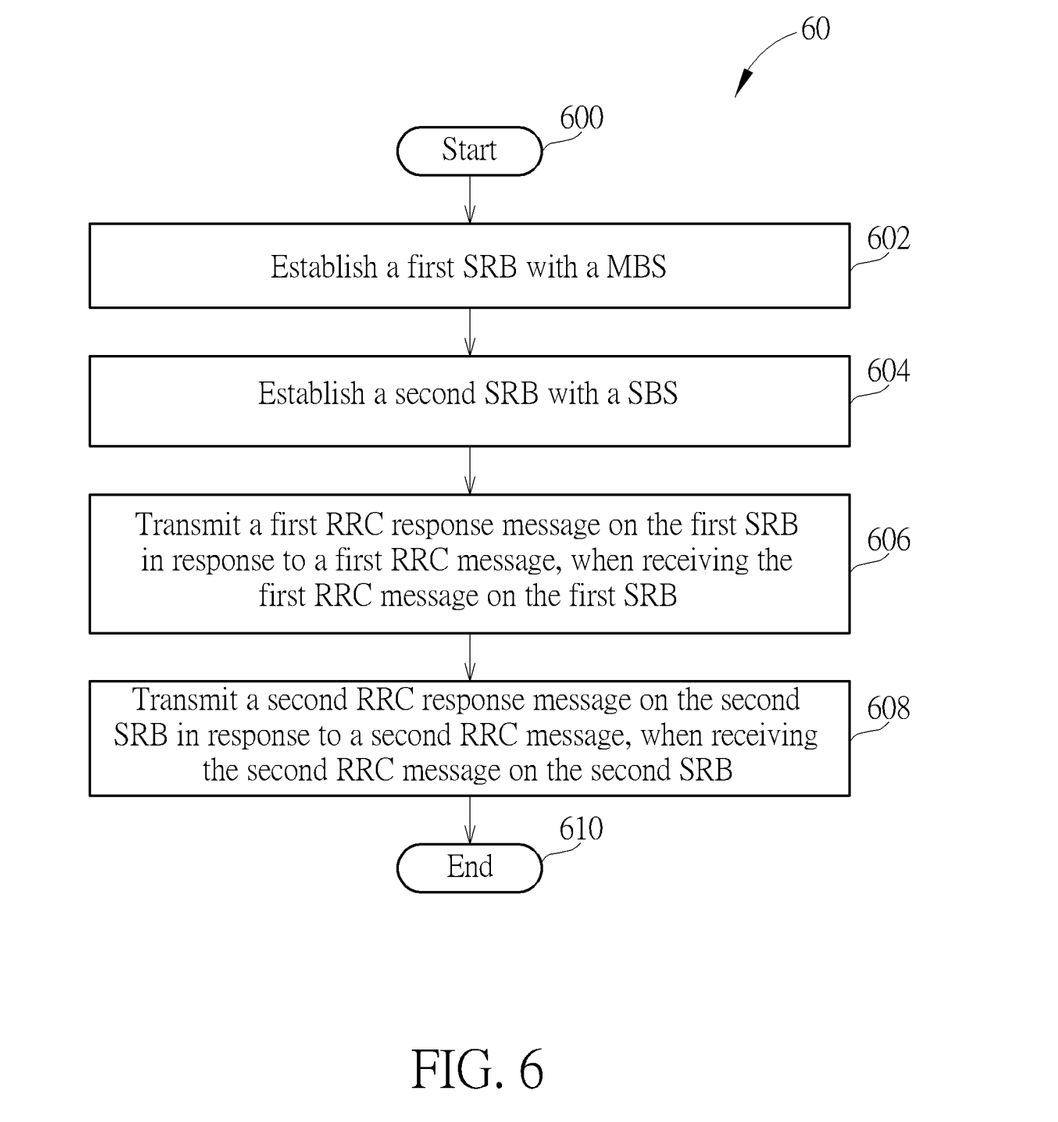
FIG. 6 is a flowchart of a process according to an example of the present invention.

A process 60 as shown in FIG. 6 is utilized in a UE, to handle communications in a DC, and includes the following steps:

Step 600: Start.
Step 602: Establish a first SRB with a MBS.
Step 604: Establish a second SRB with a SBS.
Step 606: Transmit a first RRC response message on the first SRB in response to a first RRC message, when receiving the first RRC message on the first SRB.
Step 608: Transmit a second RRC response message on the second SRB in response to a second RRC message, when receiving the second RRC message on the second SRB.
Step 610: End.

The following examples may be applied to the process 60.

In one example, the first RRC message is for configuring the second SRB to the UE, for configuring a SCG DRB to the UE, for changing the SBS, for releasing the second SRB, or for releasing the SBS. In one example, the second RRC message is for configuring (e.g., modifying or releasing) a SCG DRB to the UE, for configuring (e.g., adding or releasing) a secondary cell (SCell) of the SBS, for changing a primary SCell of the SBS, or for configuring (or reconfiguring) a measurement configuration to the UE.

In one example, when the MBS receives the first RRC message from the SBS, the MBS transmits the first RRC message on the first SRB to the UE or transmits a third RRC message including the first RRC message on the first SRB to the UE. The UE transmits the first RRC response message on the first SRB to the MBS in response to the first message or transmits a third RRC response message including the first RRC response message on the first SRB to the MBS in response to the third RRC message including the first RRC message. When the MBS receives the first RRC response message or the third RRC response message on the first SRB, the MBS knows that the first RRC message or the third RRC message has been received by the UE. Then, the MBS transmits a message to the SBS or forwards the first RRC response to the SBS. Thus, the SBS knows that the first RRC message has been received by the UE.

In one example, when the SBS receives the second RRC response message on the second SRB from the UE, the SBS knows that the second RRC message transmitted on the second SRB has been received by the UE. In one example, when the SBS receives the second RRC response message on the second SRB from the UE, the SBS transmits a message to the MBS to inform that a reconfiguration of a SBS configuration, a SCG change or a SBS change has been done successfully.

Figure 7:
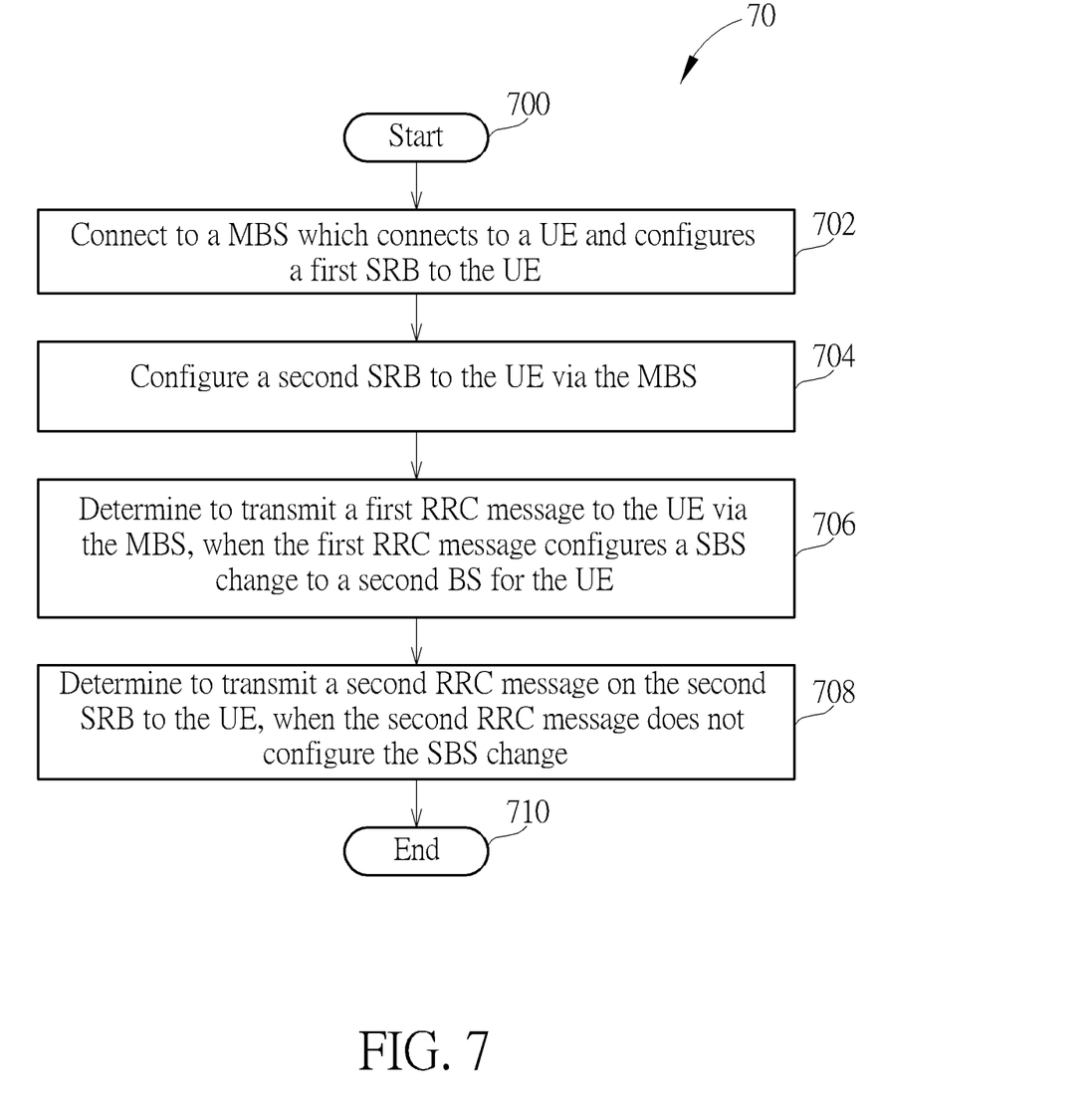
FIG. 7 is a flowchart of a process according to an example of the present invention.

A process 70 as shown in FIG. 7 is utilized in a first BS (e.g., a SBS for a UE), to handle communications in a DC, and includes the following steps:

Step 700: Start.
Step 702: Connect to a MBS which connects to the UE and configures a first SRB to the UE.
Step 704: Configure a second SRB to the UE via the MBS.
Step 706: Determine to transmit a first RRC message to the UE via the MBS, when the first RRC message configures a SBS change to a second BS for the UE.
Step 708: Determine to transmit a second RRC message on the second SRB to the UE, when the second RRC message does not configure the SBS change.
Step 710: End.

The following examples may be applied to the process 70.

In one example, the second RRC message is for configuring (e.g., modifying or releasing) a SCG DRB to the UE, for configuring (e.g., adding or releasing) a SCell of the SBS, for changing a primary SCell of the SBS, or for configuring (or reconfiguring) a measurement configuration to the UE.

The following examples may be applied to the processes 30-70.

In one example, the first RRC message includes (or simply is) a first LTE RRC Connection Reconfiguration message, and the first RRC response message includes (or simply is) a first LTE RRC Connection Reconfiguration Complete message. In one example, the first RRC message includes (or simply is) a first NR RRC Reconfiguration message, and the first RRC response message includes (or simply is) a first NR RRC Reconfiguration Complete message. In one example, the second RRC message includes (or simply is) a second LTE RRC Connection Reconfiguration message, and the second RRC response message includes (or simply is) a second LTE RRC Connection Reconfiguration Complete message. In one example, the second RRC message includes (or simply is) a second NR RRC Reconfiguration message, and the second RRC response message includes (or simply is) a second NR RRC Reconfiguration Complete message. In one example, the third RRC message includes (or simply is) a third LTE RRC Connection Reconfiguration message, and the third RRC response message includes (or simply is) a third LTE RRC Connection Reconfiguration Complete message. In one example, the third RRC message includes (or simply is) a third NR RRC Reconfiguration message, and the third RRC response message includes (or simply is) a third NR RRC Reconfiguration Complete message.

In one example, the first SRB is a MCG SRB, and the second SRB is a SCG SRB. The UE establishes the first SRB in a RRC connection establishment procedure (e.g., upon receiving a RRC Connection Setup message of the RRC connection establishment procedure) with the MBS, and establishes the second SRB in a RRC connection reconfiguration procedure (e.g., upon receiving a RRC Connection Reconfiguration message of the RRC connection reconfiguration procedure) with the MBS.

In one example, the first RRC message, the second RRC message and the third RRC message may be replaced by a first RRC configuration, a second RRC configuration and a third RRC configuration, respectively.

In one example, the UE connects to the MBS on at least one first carrier and connects to the SBS on at least one second carrier. The UE and the MBS communicate the RRC messages above on the first SRB on the at least one first carrier. The UE and the SBS communicate the RRC messages above on the second SRB on the at least one second carrier. In one example, the at least one first carrier and the at least one second carrier include the same carrier(s) or different carriers. In one example, the at least one first carrier and the at least one second carrier have the same bandwidth or different bandwidths.

In one example, the at least one first carrier and the at least one second carrier have different center frequencies or different frequency channel numbers. In one example, the at least one first carrier and the at least one second carrier have the same center frequency or the same frequency channel number but have different bandwidths.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling communications in a DC. Accordingly, the problem of handling the communications in the DC is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling communications in a dual connectivity, comprising:
a storage device; and
a processing circuit, coupled to the storage device, wherein the storage device stores, and the processing circuit is configured to execute instructions of:
establishing a first signaling radio bearer (SRB) with a master base station (MBS) in a radio resource control (RRC) connection establishment procedure;
establishing a second SRB with a secondary BS (SBS) in a RRC connection reconfiguration procedure;
transmitting a first RRC response message on the first SRB in response to a first RRC message, when receiving the first RRC message on the first SRB;
receiving a third RRC message comprising the first RRC message on the first SRB from the MBS, wherein the MBS receives the first RRC message from the SBS;
transmitting a third RRC response message comprising the first RRC response message on the first SRB to the MBS in response to the third RRC message comprising the first RRC message; and
transmitting a second RRC response message on the second SRB in response to a second RRC message, when receiving the second RRC message on the second SRB;
wherein the first RRC message configures the second SRB to the communication device;
wherein the second RRC message changes a primary SCell of the SBS.

2. The communication device of claim 1, wherein the first RRC message configures a secondary cell group (SCG) data radio bearer (DRB) to the communication device, changes the SBS, releases the second SRB, or releases the SBS.

3. The communication device of claim 1, wherein the second RRC message configures a SCG DRB to the communication device, configures a secondary cell (SCell) of the SBS or configures a measurement configuration to the communication device.

4. The communication device of claim 1, wherein the instructions further comprise:
receiving the first RRC message on the first SRB from the MBS, when the MBS receives the first RRC message from the SBS; and
transmitting the first RRC response message on the first SRB to the MBS in response to the first RRC message.

5. The communication device of claim 1, wherein the third RRC message comprises a third long-term evolution (LTE) RRC Connection Reconfiguration message and the third RRC response message comprises a third LTE RRC Connection Reconfiguration Complete message, or the third RRC message comprises a third new radio (NR) RRC Reconfiguration message and the third RRC response message comprises a third NR RRC Reconfiguration Complete message.

6. The communication device of claim 1, wherein the first RRC message comprises a first LTE RRC Connection Reconfiguration message and the first RRC response message comprises a first LTE RRC Connection Reconfiguration Complete message, or the first RRC message comprises a first NR RRC Reconfiguration message and the first RRC response message comprises a first NR RRC Reconfiguration Complete message.

7. The communication device of claim 1, wherein the second RRC message comprises a second LTE RRC Connection Reconfiguration message and the second RRC response message comprises a second LTE RRC Connection Reconfiguration Complete message, or the second RRC message comprises a second NR RRC Reconfiguration message and the second RRC response message comprises a second NR RRC Reconfiguration Complete message.

8. A method for handling communications in a dual connectivity for a communication device, comprising:
establishing a first signaling radio bearer (SRB) with a master base station (MBS);
establishing a second SRB with a secondary BS (SBS);
receiving a first radio resource control (RRC) message on the first SRB from the MBS, wherein the MBS receives the first RRC message from the SBS;
transmitting the first RRC response message on the first SRB to the MBS in response to the first RRC message;
receiving a third RRC message including the first RRC message on the first SRB;
transmitting a third RRC response message including a first RRC response message on the first SRB, in response to the third RRC message including the first RRC message; and
transmitting a second RRC response message on the second SRB in response to a second RRC message, when receiving the second RRC message on the second SRB;
wherein the first RRC response message responds to the first RRC message;
wherein the first RRC message configures the second SRB to the communication device;
wherein the second RRC message changes a primary SCell of the SBS.

9. The method of claim 8, wherein the first RRC message configures a secondary cell group (SCG) data radio bearer (DRB) to the communication device, changes the SBS, releases the second SRB, or releases the SBS.

10. The method of claim 8, wherein the second RRC message configures a secondary cell (SCell) of the SBS or configures a measurement configuration to the communication device.

11. The method of claim 8, wherein the third RRC message comprises a third long-term evolution (LTE) RRC Connection Reconfiguration message and the third RRC response message comprises a third LTE RRC Connection Reconfiguration Complete message, or the third RRC message comprises a third new radio (NR) RRC Reconfiguration message and the third RRC response message comprises a third NR RRC Reconfiguration Complete message.

12. The method of claim 8, wherein the first RRC message comprises a first LTE RRC Connection Reconfiguration message and the first RRC response message comprises a first LTE RRC Connection Reconfiguration Complete message, or the first RRC message comprises a first NR RRC Reconfiguration message and the first RRC response message comprises a first NR RRC Reconfiguration Complete message.

13. The method of claim 8, wherein the second RRC message comprises a second LTE RRC Connection Reconfiguration message and the second RRC response message comprises a second LTE RRC Connection Reconfiguration Complete message, or the second RRC message comprises a second NR RRC Reconfiguration message and the second RRC response message comprises a second NR RRC Reconfiguration Complete message.

14. A network for handling communications in a dual connectivity, comprising:
a master base station (MBS) comprising
a storage device; and
a processing circuit, coupled to the storage device,
a second base station (SBS) comprising
a storage device; and
a processing circuit, coupled to the storage device,
wherein the storage device of the MBS stores, and the processing circuit of the MBS is configured to execute instructions of:
establishing a first signaling radio bearer (SRB) with a user equipment (UE) in a RRC connection establishment procedure;
transmitting a first radio resource control (RRC) message in a RRC connection reconfiguration procedure configuring a second SRB for exchanging RRC messages between the UE and the SBS to the UE;
receiving a first RRC response message on the first SRB in response to the first RRC message received by the UE;
transmitting a third RRC message comprising the first RRC message on the first SRB to the UE, wherein the MBS receives the first RRC message from the SBS; and
receiving a third RRC response message comprising the first RRC response message on the first SRB from the UE in response to the third RRC message comprising the first RRC message; and
wherein the storage device of the SBS stores, and the processing circuit of the SBS is configured to execute instructions of:
establishing the second SRB with the UE;
transmitting a second RRC message on the second SRB to the UE; and
receiving a second RRC response message on the second SRB in response to the second RRC message received by the UE;
wherein the second RRC message changes a primary SCell of the SBS.

15. The network of claim 14, wherein the first RRC message configures a secondary cell group (SCG) data radio bearer (DRB) to the UE, changes the SBS, releases the second SRB, or releases the SBS.

16. The network of claim 14, wherein the second RRC message configures a SCG DRB to the UE, configures a secondary cell (SCell) of the SBS or configures a measurement configuration to the UE.

17. The network of claim 14, wherein the instructions further comprise:
transmitting, by the MBS, the first RRC message on the first SRB to the UE, when the MBS receives the first RRC message from the SBS; and
receiving, by the MBS, the first RRC response message on the first SRB from the UE in response to the first RRC message.

* * * * *